UNITED STATES PATENT OFFICE.

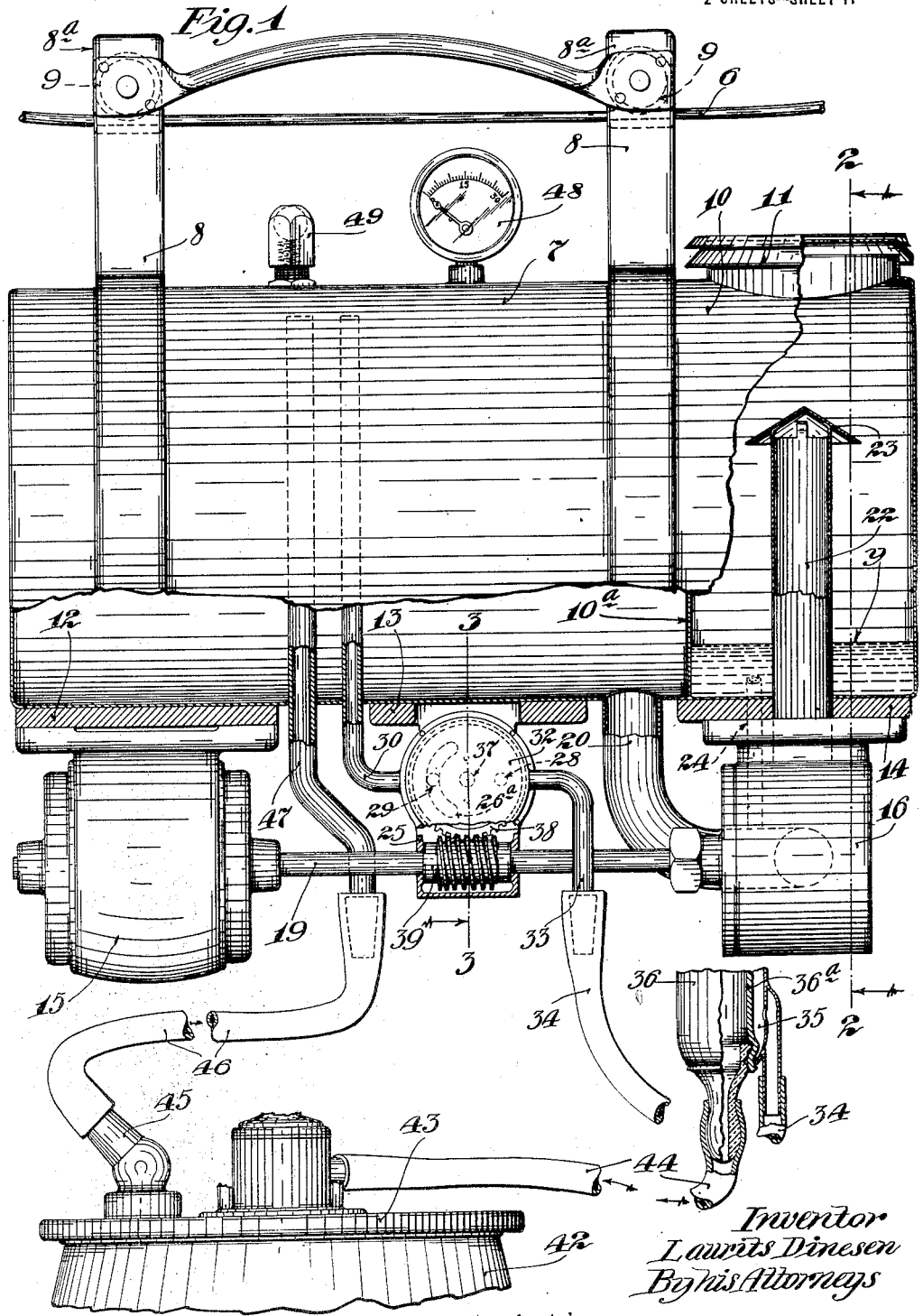

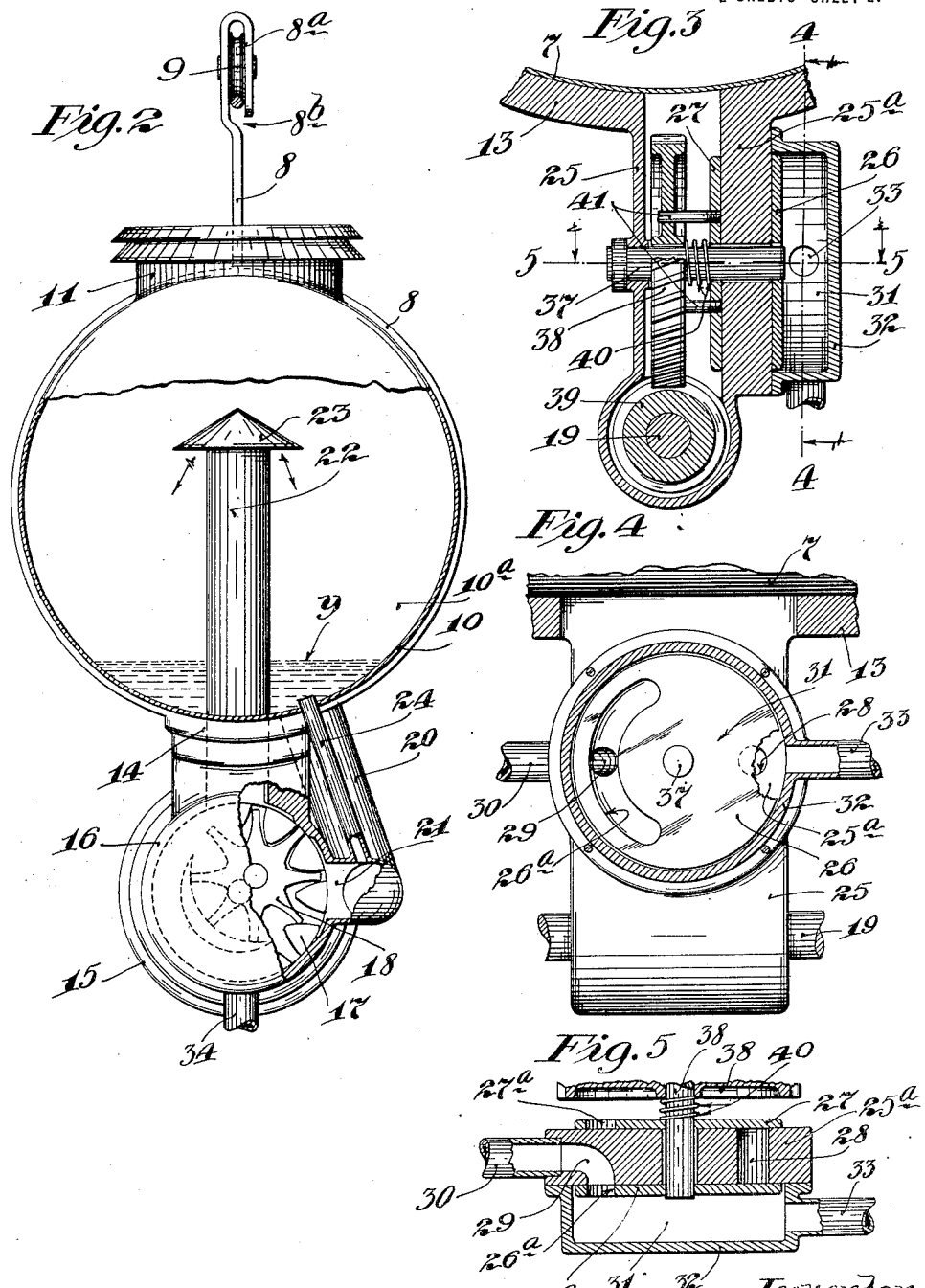

LAURITS DINESEN, OF MINNEAPOLIS, MINNESOTA.

MILKING APPARATUS.

1,410,286.     Specification of Letters Patent.     Patented Mar. 21, 1922.

Application filed June 9, 1919. Serial No. 302,692.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My invention has for its object to provide a simple and highly efficient self-contained portable milking apparatus; and to such ends, generally stated, the invention consists of the novel devices and combinations of devices hereinafter described and defined in the claims.

Hitherto, it has been customary to provide portable milk pails with teat cup connections, and sometimes the pulsating mechanism has been applied to the milk pail. Such arrangements, however, have generally required the installation of permanent air pipes leading from a vacuum tank connected to a stationary air compresser or vacuum pump.

My present invention in its preferred embodiment provides a portable vacuum tank to which is attached or moved therewith, a vacuum pump, a driving motor and a pulsator device. The vacuum tank is connected to the milk can or pail by a flexible tube so that the entire milking apparatus is portable and constitutes a complete self-contained portable milking apparatus. In such an arrangement, the vacuum tank, vacuum pump and motor may be made small and light, since they will operate on but one pail or can, with connections for milking one or two cows. With this arrangement there is no loss of vacuum, such as is incident to the use of long pipe systems.

The vacuum tank, vacuum pump, pulsator and motor constitute what may be treated as a power unit, and such unit would preferably be arranged to move on a suitable track, such an as overhead wire from which the unit may be readily detached, and hence, used on any one of several different tracks.

In the power unit there is a novel arrangement for causing the vacuum pump, which is preferably of the rotary type, to run in oil. This is important because it is very difficult to keep the running parts of a rotary vacuum pump lubricated and airtight, in the absence of a film of oil constantly running between the cooperating parts of the pump.

The preferred form of the apparatus is illustrated in the accompanying drawings wherein like characters indicate like parts throughout the several views.

Referring to the drawings:—

Fig. 1 is a view chiefly in side elevation with some parts sectioned and some parts broken away, showing the improved apparatus;

Fig. 2 is a view partly in section approximately on the line 2—2 of Fig. 1, but with some parts in full;

Fig. 3 is a section with parts sectioned on the line 3—3 of Fig. 1, but with some parts in full;

Fig. 4 is a section taken approximately on the line 4—4 of Fig. 3; and

Fig. 5 is a horizontal section taken approximately on the line 5—5 of Fig. 3, some parts being broken away.

The numeral 6 indicates a track in the form of a heavy rod or wire, suitably supported by means not shown. This tract will run along the aisle or passage back of the stalls in which the cows are kept.

The numeral 7 indicates a drum-like vacuum tank, shown as horizontally disposed and having surrounding bands 8, the ends of which are projected upward and bent to form hook-like portions 8ª in which are journaled, grooved wheels 9 that run on the rail or track 6. These hook-like portions 8ª have openings at 8ᵇ that adapt the tank to be lifted from or applied to the rail 6, at will. Vacuum tank 7 has an extended end portion 10 separated therefrom by a partition 10ª. This extension 10ª affords an oil chamber, and at its top, it has a cap covered opening 11 through which the interior of the oil chamber 10 is open to the atmosphere. As shown, three saddle plates 12, 13 and 14 are rigidly secured by welding, or otherwise, to the bottom of the tank structure 7—10. The frame of the electric motor 15 is rigidly secured to and hung below the saddle plate 12 and the casing 16 of a rotary pump is likewise secured to the saddle plate 14 and is suspended below the latter.

The pump illustrated is of the rotary type known to the trade as the "Viking Pump" manufactured by the Viking Pump Company of Cedar Rapids, Iowa, and is arranged to operate to produce partial vacuum in the tank 7, as will be presently noted. This pump, within the casing 16, has a rotor 17 in the form of an internal gear and an eccentric idler in the form of a long toothed rotary spur gear 18, the axis of which is eccentric to the axis of the gear 17.

The armature shaft 19 of motor 15 is extended, and its extended end is connected to the rotor 17 of the vacuum pump 16.

A suction pipe or tube 20 leads from the bottom of vacuum tank 7 to the peripheral intake port 21 of pump casing 16; and an air discharge stack 22 leads from the peripheral discharge port of said casing 16, up into the oil chamber 10, being, as shown, provided with a deflecting cap 23 at its upper end. An oil return tube 24 leads from the lower portion of oil chamber 10 to the intake port 21 of pump casing. This oil pipe 24 is relatively small, as compared with pipes or tubes 20 and 22, for an important purpose which will presently appear.

The pulsator, which, as an important feature, is preferably carried with the vacuum tank, may take various forms, but as shown, it comprises as follows:

Secured to, or formed as a part of, the saddle plate 13 is a housing 25, one side flange 25ª of which is machined on both faces to afford parallel seats for rotary disk-like valves 26 and 27. Flange 25ª has two ports 28 and 29, the former of which extends through from one valve engaging face to the other thereof, and the latter of which ports leads from the face surface with which valve 26 engages, through one edge of said flange. Valves 26 and 27 are provided, respectively, with segmental ports 26ª and 27ª and are adapted to operate as hereinafter described, and which extend preferably somewhat less than through an arc of 180 degrees.

Port 29 is connected to one end of the pipe 30 and extends into vacuum tank 7 and terminates, preferably, near the top thereof. Valve 26 works in a closed pulsation chamber 31 that is formed within a casing 32 rigidly secured to the exterior of flange 25ª. Pulsation chamber 32 has an extended pipe or nipple 33 that is connected by a flexible tube 34 to the outer chamber 35 of a teat cup 36. Here it may be stated that the teat cup here illustrated is preferably of the character disclosed and claimed in my prior Patent No. 1,072,584, granted of date September 9, 1913, and entitled Milking apparatus, the same being of the so-called two-chamber type wherein a surrounded annular chamber is intermittently subjected to partial vacuum and to atmospheric pressure. Both of the valves 26 and 27 rotate with a short shaft 37 that rotates through and is journaled in the walls or flanges of the housing 25. Within said housing, a shaft 37 is provided with a worm gear 38 that meshes with a worm 39, also in said housing. The motor shaft 19 extends through the lower portion of the housing 25 and the worm 39 is rigidly secured to said shaft for rotation therewith. Valve 27 is laterally movable on shaft 37 and is spring pressed against its seat by a coiled spring 40 compressed between the same and hub of gear 38. Valve 37 is shown as provided with projecting studs 41 that work through perforations in the web of gear 38.

The numeral 42 indicates the milk can provided with an air-tight cover 43. This milk can, through its cover, is connected to the inner or milk chamber of the teat cup 36 by a suitable long flexible milk delivery tube 44. In the illustration given, the tubes 34 and 44 are shown as directly connected to but one teat cup, but it will be understood, in practice, that they will be indirectly connected, each to a plurality of teat cups through a suitable coupling head, not necessary for the purposes of this case to consider. The cover 43 is provided with a nipple 45 that opens into the interior of the can and is connected by a flexible suction tube 46 to the lower end of a suction pipe 47 that extends upward into the vacuum tank 7, and preferably terminates near the top thereof.

In Fig. 1, the numeral 48 indicates a vacuum gage and the numeral 49 indicates a safety valve for preventing too strong vacuum within the tank 7.

The numeral 36ª indicates a flexible tubular wall or diaphragm within the teat cup that separates the inner and outer chambers thereof. The character $y$ indicates lubricating oil shown as contained in oil chamber 10.

*Operation.*

The manner in which pulsations will be produced in the teat cups, partial vacuum maintained in the milk can, the milk will be drawn from the teat cups to the can, is probably obvious, but may be briefly stated as follows:

When the motor 15 is in action, the vacuum pump will draw air from vacuum tank 7 through tube 20 and will discharge the same, through tube 22 into oil chamber 10 from which latter the air will be exhausted through cap or dome 11. The partial vacuum thus maintained in tank 7 will maintain a constant vacuum in milk can 42 and in tube 30.

When the port 26ª of valve 26 is in alignment with port 29, air suction tube 30 will be connected, through pulsation chamber 31 and tube 34 into the outer chambers 35 of the teat cups, so that the flexible walls 36ª of said cups will be subjected to partial vacuum, and hence, will expand, thereby relieving the teats from pressure thereof. At this time, and in fact, at all times, the inner chambers of the teat cups will be connected, through tube 44 to the interior of the can 42 for the delivery of milk, and all the time subject to partial vacuum.

When the ports 26ª and 27ª of the two valves 26 and 27 are aligned with port 28, pulsation chamber 31 will be cut off from suction tube 30 and open to the atmosphere, so that air under atmospheric pressure will rush in through port 28 to chamber 31 and tube 34 to the outer chambers 35 of the teat cup, thereby causing contraction of the elastic walls 36ª of the said teat cups, and thereby produce a squeezing of the teats to accelerate the flow of milk. This action, as already indicated, takes place while the inner chambers of the teat cups are subject to partial vacuum through tube 44 and the milk can. Thus the pressure pulsations for producing the milking action are produced.

The lubricating oil $y$ shown in Fig. 1 is contained entirely within oil chamber 10, when motor 15 and the running parts of the apparatus are idle, will flow through overflow tube 24 into tube 20 nearly or quite filling the same, or if the oil is in sufficient quantities, may even flow into the lower portion of vacuum tank 7. When the motor is started and the vacuum pump thrown into action, however, this oil will be rapidly pumped from tank 7 and tube 20 through the running parts of the pump and the stack 22 and will be discharged therefrom and deflected downward to the bottom of said oil chamber. While the pump is in action there will be a comparatively slow and constant return of oil through overflow tube to the lower portion of air tube 20, and from thence, back through pump and tube 22 to the oil chamber 10. Thus an ample supply of oil, not only that required for lubrication, but sufficient to keep the complete film of oil between all of the joints of the pump during the running action will be constantly maintained. As already indicated, the pumping efficiency of the pump is very greatly increased by this constant and copious supply of oil through the pump with the air.

What I claim is:

1. In a milking apparatus a power unit arranged to be mounted for travel on a supporting track and adapted to be positioned for successive attachment to one or more milk receptacles spaced from said power unit, comprising a vacuum tank, a motor and a pump actuated by said motor and adapted for maintaining a partial vacuum in said tank, said tank having means for connection with said milk receptacles.

2. In a milking apparatus a power unit arranged to be mounted for travel on a supporting track and adapted to be positioned for successive attachment to one or more milk receptacles spaced from said power unit, comprising a vacuum tank, a motor and a pump actuated by said motor and adapted for maintaining a partial vacuum in said tank, said tank having means for connection with said milk receptacles, and a pulsator carried by said tank and arranged for connection with a teat cup.

3. In a milking apparatus a power unit arranged to be mounted for travel on a supporting track and adapted to be positioned for successive attachment to one or more milk receptacles spaced from said power unit, comprising a vacuum tank, a motor and a pump actuated by said motor and adapted for maintaining a partial vacuum in said tank, connections leading from the tank for attachment respectively to a milk receptacle and to a teat cup and a pulsator in the teat cup connection, and operable by the motor for alternately connecting the teat cup with the tank and with the atmosphere.

4. In a milking apparatus a power unit comprising a vacuum tank of substantially cylindrical form provided with means for supporting the same for travel on an overhead track, a connected motor, and a vacuum pump sustained below the tank, respectively adjacent the ends thereof, connections from the tank for attachment respectively to a milk receptacle and to a teat cup, a pulsator in the teat cup connection sustained from the tank intermediate the motor and pump, and a driving connection from the motor shaft to the pulsator.

5. In a milking apparatus, an overhead track, a power unit mounted for travel on said track and including a motor, a motor-actuated vacuum device and a pulsator, in combination with a milk receptacle supported and movable independently of said track and power unit, teat cups, a tube connecting said milk receptacle to the vacuum device of said power unit, a milk tube connecting said teat cups to said milk receptacle, and an air tube connecting said teat cups to the pulsator of said power unit.

6. In a milking apparatus, an overhead track, a power unit mounted to travel on said track and including a motor, a motor-actuated vacuum device and a pulsator, in combination with a milk receptacle supported and movable independently of said track and power unit, teat cups having inner and outer chambers, an air tube connecting said milk receptacle to the vacuum device of said power unit, a milk tube connecting the inner chambers of said teat cups to said milk receptacle, and an air tube connecting the outer chambers of said teat cups to the pulsator of said power unit.

7. In a milking apparatus, an overhead track, a power unit mounted to travel on said track and including a vacuum tank and a motor-actuated vacuum pump with connections for maintaining a partial vacuum in said tank, in combination with a closed milk receptacle supported and movable independently of said track and power unit, a flexible air tube connecting said milk receptacle to the vacuum tank of said power unit, teat cups having inner and outer chambers, a flexible air tube connecting the outer chambers of said teat cups to said vacuum tank, a flexible milk tube connecting the inner chambers of said teat cups to said milk receptacle, and a pulsator actuated by force produced by the motor of said power unit and operative to produce pressure pulsations in said teat cups.

8. In a milking apparatus, an overhead track, a power unit mounted to travel on said track and including a vacuum tank, a motor, a motor-actuated vacuum pump operative to maintain partial vacuum in said tank, and a motor-actuated pulsator, in combination with a milk receptacle, a flexible air tube connecting said milk receptacle to the vacuum tank of said power unit, teat cups having inner and outer chambers, a flexible milk tube connecting the inner chambers of said teat cups to said milk receptacle, and a flexible air tube connecting the outer chambers of said teat cups to said pulsator, said pulsator being arranged for alternate connection to said vacuum tank and to the atmosphere.

9. In a milking apparatus, a supporting track, and a power unit arranged to travel on said track to positions for successive milking operations and including a motor and a motor-actuated vacuum device, in combination with a milk receptacle supported and movable independently of said track and power unit, a flexible air tube connecting said milk receptacle to the vacuum device of said power unit, teat cups, a flexible milk tube connecting said teat cups to said milk receptacles, and a pulsator actuated by force produced by the motor of said power unit and connected to said teat cups for producing pressure pulsations therein.

In testimony whereof I affix my signature in presence of two witnesses.

LAURITS DINESEN.

Witnesses:
BERNICE G. BAUMANN,
HARRY D. KILGORE.